(12) United States Patent
Vergnes et al.

(10) Patent No.: US 8,102,401 B2
(45) Date of Patent: Jan. 24, 2012

(54) DISPLAY CONTROLLER OPERATING MODE USING MULTIPLE DATA BUFFERS

(75) Inventors: Alain Vergnes, Trets (FR); Sebastien Younes, Pourrieres (FR); Jerome Alingry, Aix en Provence (FR)

(73) Assignee: Atmel Corporation, San Jose, CA (US)

( * ) Notice: Subject to any disclaimer, the term of this patent is extended or adjusted under 35 U.S.C. 154(b) by 1058 days.

(21) Appl. No.: 11/740,107

(22) Filed: Apr. 25, 2007

(65) Prior Publication Data

US 2008/0266301 A1 Oct. 30, 2008

(51) Int. Cl.
*G06F 13/00* (2006.01)
*G09G 5/399* (2006.01)
*G09G 5/36* (2006.01)

(52) U.S. Cl. ........ 345/545; 345/536; 345/537; 345/539; 345/559; 345/211

(58) Field of Classification Search .................. 345/536, 345/539, 545, 559, 211, 537
See application file for complete search history.

(56) References Cited

U.S. PATENT DOCUMENTS

| | | | |
|---|---|---|---|
| 3,921,164 A | | 11/1975 | Anderson |
| 5,001,469 A | * | 3/1991 | Pappas et al. ................. 715/790 |
| 5,008,838 A | * | 4/1991 | Kelleher et al. ............... 345/422 |
| 5,543,824 A | * | 8/1996 | Priem et al. ................... 345/539 |
| 5,587,726 A | * | 12/1996 | Moffat .......................... 345/539 |
| 5,691,745 A | * | 11/1997 | Mital ............................ 345/692 |
| 5,742,788 A | * | 4/1998 | Priem et al. ................... 711/110 |
| 5,831,638 A | * | 11/1998 | West et al. .................... 345/539 |
| 5,864,336 A | * | 1/1999 | Yano ............................. 713/321 |
| 6,950,144 B2 | * | 9/2005 | Chae ............................. 348/513 |
| 7,081,897 B2 | * | 7/2006 | Garg ............................. 345/543 |
| 2002/0113781 A1 | | 8/2002 | Ishiyama |
| 2005/0225556 A1 | * | 10/2005 | Booth, Jr. ...................... 345/537 |
| 2006/0098864 A1 | * | 5/2006 | Ziel ............................... 382/154 |
| 2008/0100636 A1 | * | 5/2008 | Lai et al. ....................... 345/546 |
| 2008/0143695 A1 | * | 6/2008 | Juenemann et al. .......... 345/204 |
| 2008/0246746 A1 | * | 10/2008 | Vergnes et al. ............... 345/204 |

FOREIGN PATENT DOCUMENTS

| | | |
|---|---|---|
| EP | 1048999 A2 | 11/2000 |
| EP | 1164571 A1 | 12/2001 |
| EP | 1557751 A2 | 7/2005 |
| WO | WO-2008/133885 A1 | 11/2008 |

OTHER PUBLICATIONS

"International Application Serial No. PCT/US2008/005199, International Search Report mailed Oct. 1, 2008", 4 pgs.
"International Application Serial No. PCT/US2008/005199, Written Opinion mailed Oct. 1, 2008", 8 pgs.

\* cited by examiner

*Primary Examiner* — Daniel Washburn
(74) *Attorney, Agent, or Firm* — Fish & Richardson P.C.

(57) ABSTRACT

A display controller unit for controlling a display on a display panel comprises a first set of registers to hold data to be displayed and a second set of registers loadable from the first set of registers. A set of multiplexers has first data inputs coupled to the first set of registers, second data inputs coupled to the second set of registers, and select inputs. Logic circuitry is coupled to the output of the set of multiplexers and to the control inputs of the multiplexers, the control circuitry providing select information to the set of multiplexers and providing waveforms to the display panel to selectively display data from the first set of registers and the second set of registers in accordance with the select information.

8 Claims, 4 Drawing Sheets

DISPLAY CONTROLLER OPERATING MODE USING MULTIPLE DATA BUFFERS

BACKGROUND OF THE INVENTION

1. Field of the Invention

The present invention relates to display controllers architecture generally and especially to twisted nematic LCD controllers embedded in microcontrollers which interface to LCD displays but is not limited to this kind of displays and may address other types of display controllers.

2. The Prior Art

Integrated circuit driven display panels, especially passive Twisted Nematic Liquid Crystal Displays (TN LCD) have been well known for 30 years and can be found in many electronic devices, especially in battery powered devices such as watches, games, digital cameras and other devices.

When powered by batteries, the electronic device must reduce its consumption as much as possible to improve the battery lifetime. Therefore, reduced power modes of operation have been designed. As an example when only a single static image must be displayed, the powered circuitry can be limited to the display panel itself and the minimum logic circuitry to generate the displayed image rather than powering the entire microcontroller logic including the microprocessor.

When an application (watch, remote control, calculator, digital camera) is in standby/low power some images may still appear on the display to inform user about their mode of operation (standby, advertising). Such images often appear blinking, such as the well known colon in watch displays. More sophisticated displays may replace the blank period of the traditional blinking mode by presenting a different image, thus displaying more info, or impart visual dynamics to the displayed image.

To provide an attractive display when an electronic appliance is in use, images can be also changed from time to time. To do this, it is not possible to power only the display controller circuitry, but the application must also reload the new images. Therefore it is common practice to wake up the microprocessor and associated logic (PLL, memories, regulators, etc.) so that the software can reload an image into the holding/frame buffer of the display controller. When this task has been completed, the microprocessor and associated logic can be powered off to reduce power consumption.

Many LCD display controllers also include two buffers containing data to be displayed in order to correctly display an image when it is updated to minimize display flickering. A user buffer is provided to store updated image information. The display buffer is loaded from the user buffer (also known as a holding buffer) at a selected time slot location of the display frame. Even with such capabilities, from the application point of view there is only one frame that can be loaded in the display controller.

BRIEF DESCRIPTION

A display controller unit for controlling a display on a display panel comprises a first set of registers to hold data to be displayed and a second set of registers loadable from the first set of registers. A set of multiplexers has first data inputs coupled to the first set of registers, second data inputs coupled to the second set of registers, and select inputs. Logic circuitry is coupled to the output of the set of multiplexers and to the control inputs of the multiplexers, the control circuitry providing select information to the set of multiplexers and providing waveforms to the display panel to selectively display data from the first set of registers and the second set of registers in accordance with the select information.

The present invention reduces the overall power consumption of a microcontroller using such a display controller especially when the display controller is the only active logic in the microcontroller for some modes of operation.

The invention selects among two data buffers located in the display controller, each of them storing a different image to alternately display the images. There is no need for software intervention so the CPU remains in standby mode and minimizes power consumption to the display controller and the display panel.

The present invention takes advantage of the display data buffers already used in normal operation mode when refreshing the display with new images. The existing circuitry for standard blinking mode is used to drive the select input of additional multiplexers to select data from either the display buffer or the user buffer.

BRIEF DESCRIPTION OF THE DRAWING FIGURES

DETAILED DESCRIPTION

Persons of ordinary skill in the art will realize that the following description of the present invention is illustrative only and not in any way limiting. Other embodiments of the invention will readily suggest themselves to such skilled persons.

One aspect of the invention includes circuitry that creates two (or more) frame buffers from the existing display buffer and user buffer. This arrangement allows the alternate display of two images without any software intervention and therefore limits power consumption by avoiding unnecessary microcontroller (or software) operation.

Figure 1:
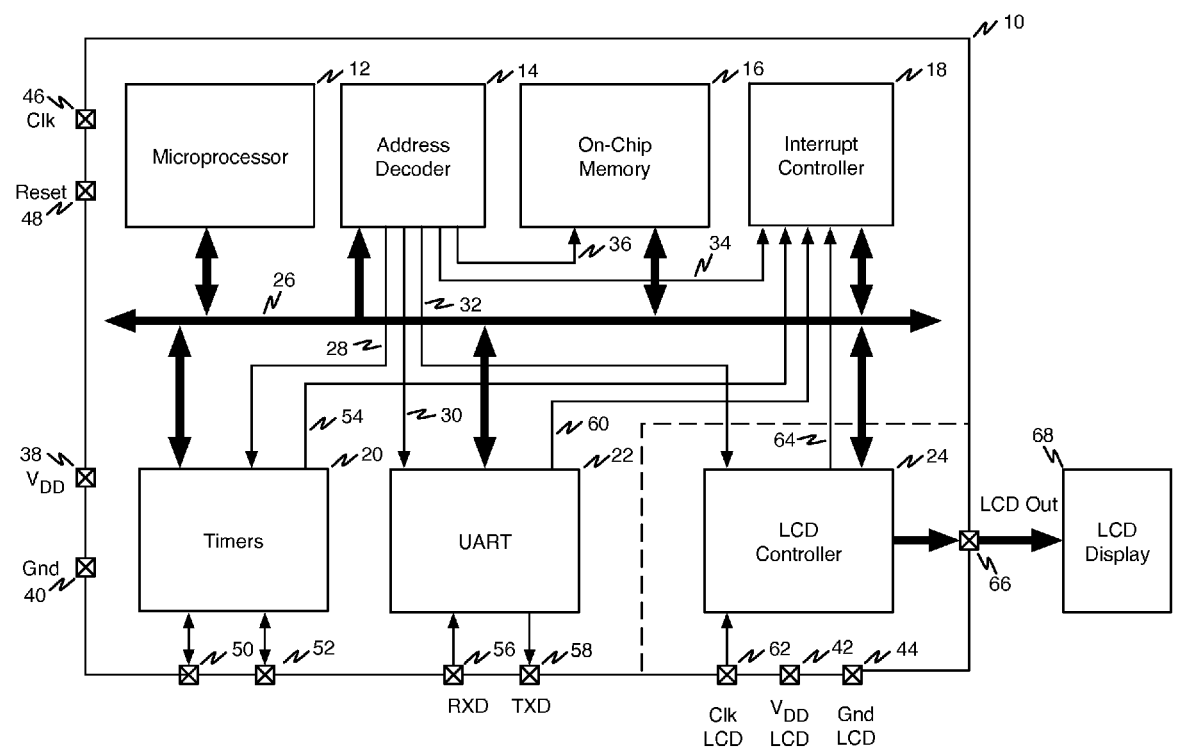
FIG. 1 is a block diagram of a multi-supply microcontroller with an embedded LCD display controller

Referring first to FIG. 1, a block diagram shows a simple microcontroller system 10, as may be found in the prior art. The microcontroller system 10 includes a microprocessor 12 using address decoder 14 to access on-chip memories 16, interrupt controller 18, and peripheral circuits like timers 20, UART 22 and LCD controller 24 across system bus 26. The data exchanges are performed by means of the system bus 26 which comprises (not shown) a read data bus carrying data from the peripherals to the microprocessor 12, a write data bus carrying data from microprocessor 12 to the peripherals, an address bus and control signals to indicate transfer direction on the system bus 26.

As will be appreciated by persons of ordinary skill in the art, the system bus 26 is shared by all peripherals and address decoder 14 is needed to decode the value carried on this bus to select one peripheral at a time. Address decoder 14 receives an address and provides select signals on lines 28, 30, 32, 34, and 36 to the peripheral circuits. On-chip memory 16 is used to store the application software processed by microprocessor 12 as is known in the art.

Power is supplied to microcontroller system chip 10 by I/O pads 38 and 40, carrying $V_{DD}$ and ground, respectively. Power is supplied separately to LCD controller 24 by I/O pads 42 and 44, carrying VDD and ground, respectively. Separately supplying power to the LCD controller 24 allows low-power operation when the functions performed by microprocessor 12 and the peripherals are not needed, since the power at I/O pads 38 and 40 may be shut down when not needed.

I/O pads 46 and 48 are used to supply clock and reset signals to the microcontroller system 10. I/O pads 50 and 52 are used to supply signals to timer 20 as is known in the art. Output line 54 from timer 20 is coupled to interrupt controller 18 as is known in the art. I/O pads 56 and 58 are the RXD and TXD connections to UART 22. Output line 60 from UART 22 is coupled to interrupt controller 18 as is known in the art. I/O pad 62 is used to separately supply a clock signal to LCD controller 24. Output line 64 from LCD controller 24 is coupled to interrupt controller 18 as is known in the art. The output from LCD controller 24 is provided on I/O pads 66 and used to drive LCD display panel 68.

To display an image, the software located in on-chip memory 16 is fetched by microprocessor 12 by means of read accesses performed on system bus 26 as is known in the art. The on-chip memory 16 is selected (signal 36 is active) as soon as the address value placed on the address bus by address decoder 14 matches the address range allocated to the on-chip memory 16. The memory 16 drives the data onto system bus 26 which is read by microprocessor 12 and processed accordingly.

The image to be displayed on twisted Nematic passive (or other) LCD panel can be considered as a bit stream, one bit for each LCD dot. If the number of dots exceeds the data size of the system bus 26, several accesses will be required to transfer the full image contained in on-chip memory 16 to display controller 24. Methods to achieve such data transfers are known in the art.

Figure 2:
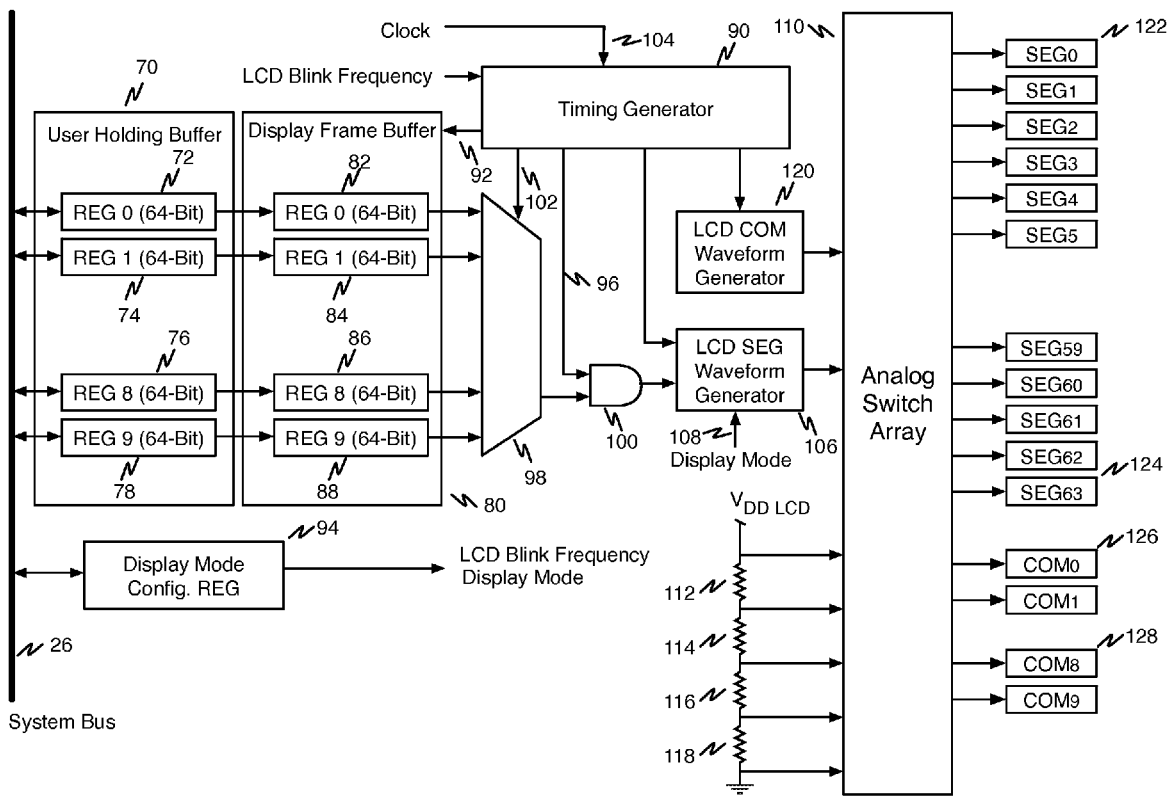
FIG. 2 is a block diagram of a prior-art LCD controller such as may be used in the microcontroller of FIG. 1.

As will be seen in FIG. 2, the display controller 24 must contain an image buffer that can be fully loaded from the system bus when the associated select signal 32 is active. When the microprocessor 12 is instructed to load image into display controller 24, write accesses are performed on system bus 26.

As soon as all write accesses have been performed there is nothing more for the microprocessor 12 to do and therefore it can be powered off, as well as the other modules 14, 16, 18, 20, and 22. For example, just after having finished transferring the image, the microprocessor 12 can perform an access into UART module 22 that would be externally connected (not shown) to a companion chip to manage the power of the microprocessor 12 and other modules powered by same supply lines (14, 16, 18, 20, and 22). For example the companion chip would receive through RXD/TXD connections 56 and 58 data that would cause the power at I/O pads 46 and 48 to be switched off. For example, the companion chip may drive a control pin of a discrete regulator providing the power-supply voltages to microcontroller system 10.

Referring now to FIG. 2, a block diagram shows illustrative architectural details of the LCD controller 24. The display controller 24 is connected to the system bus 26 to receive and provide data to the microprocessor 12. LCD controller 24 includes a first buffer 70 comprising a series of registers including registers 72, 74, 76, and 78 to store the bit stream for the image to be displayed. FIG. 2 illustrates a configuration including ten registers. Buffer 70 may be referred to as a "user holding buffer."

Registers 72 through 78 can be loaded with the data value carried on system bus 26 only if the system bus 26 carries a load-enable signal and if the address bus carries a value identifying the specific register. One address value is assigned to each register. Therefore there is a need for an internal address decoder associated with buffer 70 (not shown but different from one described with reference to FIG. 1).

The LCD display controller 24 contains a second buffer 80, which may be referred to as a "frame buffer." Frame buffer 80 contains a copy of the bit stream which is stored in user holding buffer 70. Buffer 80 also comprises a series of registers including registers 82, 84, 86, and 88 to store the bit stream for the image to be displayed. FIG. 2 illustrates a configuration including ten registers. Loading the frame buffer 80 with the contents of the user buffer 70 is automatically performed by timing generation circuitry 90 by asserting a signal on line 92.

The LCD display controller 24 contains configuration registers 94 that can be accessed at a unique address. The configuration registers 94 specify the operating modes of the LCD display controller 24, such as (but not limited) to the blinking frequency, the display mode which can allow addressing different types of LCD panels (e.g., ones having one, two, three or four common terminals).

Considering the blinking mode, the displayed data results in two periods, one with the image where the dots of the LCD panel are energized according to the bit stream located in the display frame buffer 80 and the other with all dots blanked (non-energized). The timing generator 90 provides a toggling signal on line 96 that clears the output of the multiplexer 98 to blank the dots when it is at logical 0 and passes the output of multiplexer 98 when high to produce the image display. A set of AND gates 100 can provide this function as shown in FIG. 2.

The LCD display controller 24 uses a multiplexing technique to provide data to the LCD panel. The multiplexed LCD display panels have two different sets of terminals, usually "common" terminals and "segment" terminals. Therefore both internal buffers 70 and 80 are organized accordingly to address the LCD panel terminal arrangement.

The multiplexed LCD panel is organized as a matrix. There are several terminals usually called "COMMON". Each of these common terminals access several other terminals called "SEGMENT" of the LCD panels through a capacitor whose dielectric is comprised of liquid crystal material.

For example, to drive a LCD panel arranged as 10 COMMONS×64 SEGMENTS, the LCD display controller data buffers will be organized as 10 registers of 64-bit as shown in FIG. 2, one 64-bit register for each common terminal. Therefore these registers must be multiplexed because the LCD panel has only 64 SEGMENTS terminals. The multiplexer 98 in the LCD display controller is arranged as a 64×10:1 multiplexer. The select inputs of multiplexer 98 are driven from the timing generator module 90 on signal lines 102.

Each of the registers (82, 84, 86, and 88) in the frame buffer is periodically selected. The period of selection for each register is called the "frame period". The frame period depends on the number of commons addressed on the LCD panel and also on other parameters including the clock frequency divider that divides the frequency of clock signal 104. The divider circuitry is contained within the timing generator 90. This clock frequency divider is not mandatory but it is common to use a watch crystal oscillator (32.768 KHz) to drive the display circuitry. The 32.768 KHz clock is used because it is derived from a crystal and therefore it is very accurate and is often used in other parts (not shown) of the microcontroller like for example a real time clock, and periodic interval timer where accuracy is mandatory. This frequency is high compared to the image display frequency 50 to 100 Hz, so there is a need to divide it if a source such as a watch crystal oscillator is used for the clock signal.

The output of multiplexer 98 carries the data to be provided to SEGMENTS terminals of the LCD display panel but needs to be processed before it can be displayed. This is done by means of waveform generator 106, which takes into account the type of LCD panel to be addressed. The type of LCD panel to be addressed is configured by a user via signal line 108 (Display Mode) from the configuration register 94. Waveform generator 106 is a digital module and does not generate the direct waveform but rather provides the command selection inputs of the associated analog multiplexer 110. Analog multiplexer 110 is an array of analog multiplexers (one for each terminal of the LCD display panel) which select among four voltages provided by a resistor ladder including resistors 112, 114, 116, and 118 as is known in the art. The resistor ladder acts as a voltage divider providing all required voltage values, for example $¾V_{DD\ LCD}$, $½V_{DD\ LCD}$, and $¼V_{DD\ LCD}$ for LCD panels having more than three common terminals. Each analog multiplexer includes selection inputs driven by the waveform generator 106 for segment terminals or the similar waveform generator 120 for the common terminals.

There are a set of analog multiplexers for the common terminals and a set of analog multiplexers for the segment terminals. They are all identical in their intrinsic structure but their select inputs are not driven the same way as will be understood by persons of ordinary skill in the art. FIG. 2 shows sets of segment terminals (illustrative ones designated by reference numerals 122 and 124) and common terminals (illustrative ones designated by reference numerals 126 and 128) used to couple the image signals to the matrix of the LCD display.

Figure 3:
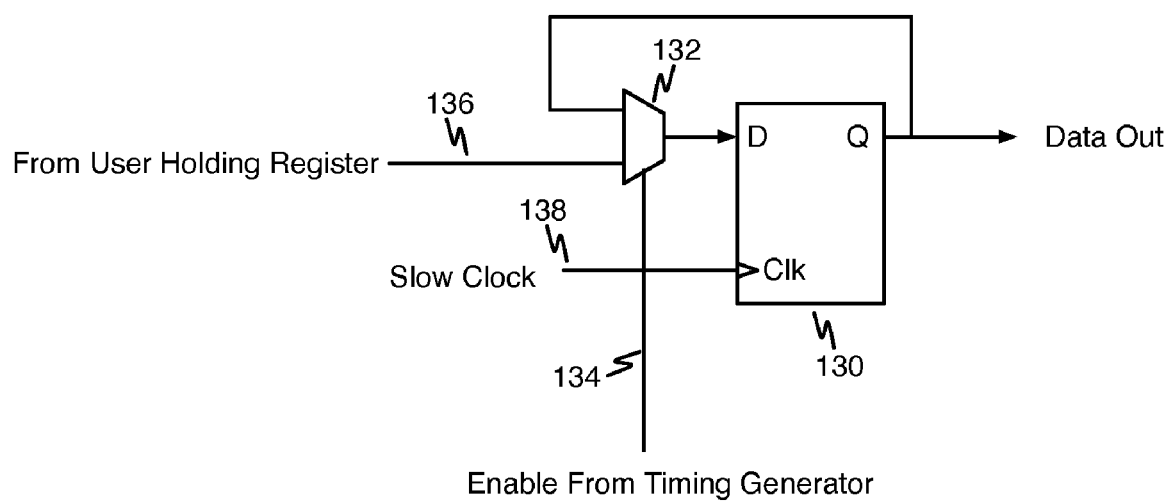
FIG. 3 is a block diagram of a portion of a register formed from a set of D-flip-flops, one for each data bit, and an associated set of multiplexers.

Referring now to FIG. 3, a block diagram shows that a register may be formed from a set of D-flip-flops (DFF) 130, one for each data bit, and an associated set of multiplexers 132 to re-circulate and thus store the data. For each register (e.g., 64-bit), the select input of the multiplexers 132 are connected to the same signal line 134 driven by the timing generator module 90 of FIG. 2. When asserted this signal allows loading the data carried by the user holding register provided on signal line 136. The data carried on signal line 136 passes directly to the output of DFF 130. When de-asserted the data are re-circulated through multiplexer 132. The DFFs 130 require a clock on signal line 138 which is the same for all the DFFs. This can be for example the same clock signal as the other DFFs of the other modules of the display controller.

The waveform generators 106 and 120 of FIG. 2 must drive the select input of the analog multiplexers. DC current is not accepted by the LCD panels. Therefore a LCD driver must maintain a 0 Volt DC potential across each pixel. The resulting voltage across a pixel is the segment voltage minus the common voltage. If the average resulting voltage is below a particular voltage the pixel is said "non-energized" and it will appear non visible whereas if the average voltage across the pixel is greater than the particular voltage it will appear visible.

Some modes of operation can provide capabilities to make all or a part of the image blink. This is a well known mode of operation in electronic appliances displaying time in which the numerals indicating hours and minutes are constantly displayed and the passage of seconds are indicated by a blinking ":" character. If the entire image is blinking, the prior art architecture described in FIG. 2 can be used. Depending on the user configuration programmed in configuration register 94, the blinking frequency information carried on part of the output of configuration register 94 may be different from 0. In such a case timing generator 90 drives signal line 96 with a square waveform.

When signal line 96 is cleared, the set of AND gates 100 clear data received from display frame buffer 80 and therefore image is blanked. When not cleared, signal line 96 passes the image data and allows the image to be visible. This is the energized period of the blinking period.

The logic to perform this kind of blinking is very simple but it does not allow blinking of selected portions of the image or inversion of some part of the image to obtain special display effects like pseudo animated pictures or displaying some kind of scrolling text.

The present invention enables these sorts of effects and also allows two different images to be stored in the existing buffers. The gate overhead is limited because the present invention employs the frame buffer and the user holding buffer that already exist in prior-art architectures. Therefore with these two buffers, a particular area of the picture can made to appear to blink although, in fact, two different images are stored and can be alternately displayed. Of course, the two images may be displayed individually, resulting in a display capable of presenting more information.

If the images are text based, the first displayed image can be for example "ATMEL" and the second one "CORP.", displaying alternatively these images will give more information on display panel without the need to wake the microcontroller to use the software to control the different images, limiting the power consumption of the electronic device in this mode of operation.

Figure 4:
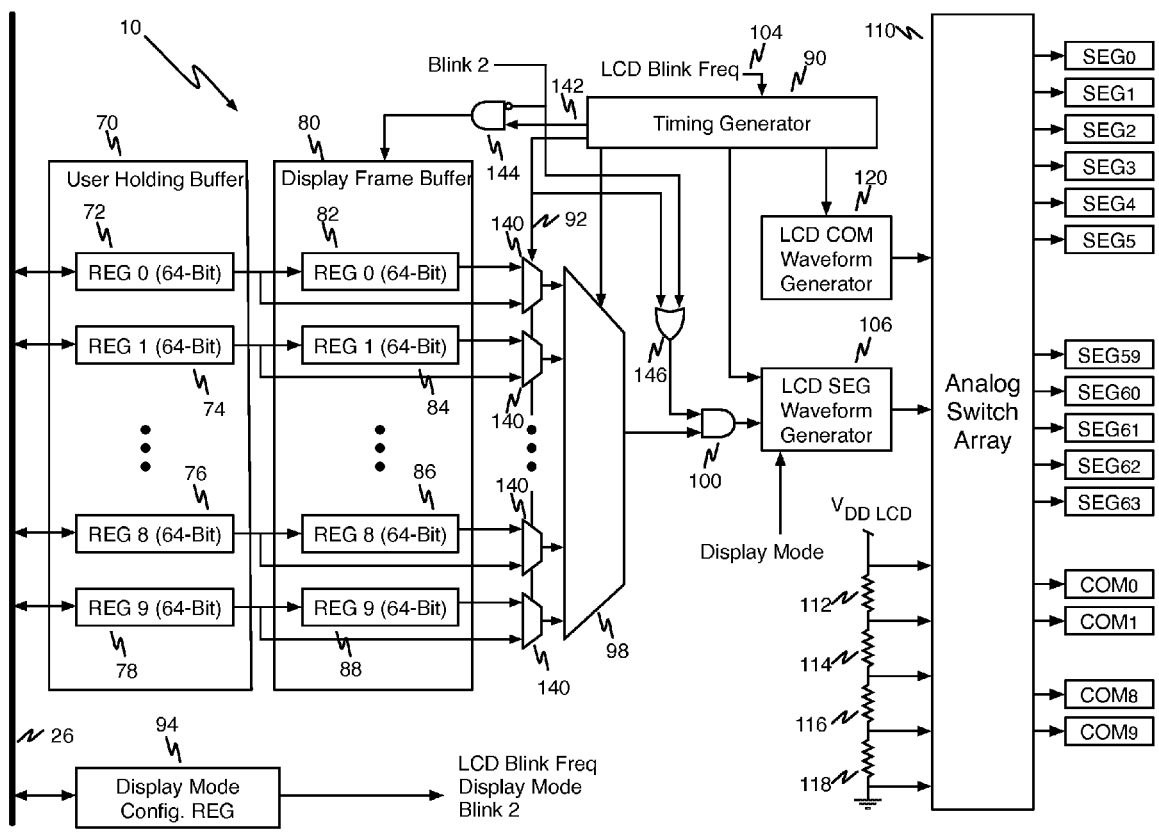
FIG. 4 is a block diagram of an illustrative LCD controller according to the present invention such as may be used in the microcontroller of FIG. 1 in place of the microcontroller of FIG. 2.

Referring now to FIG. 4, a block diagram of an illustrative architecture according to the present invention is shown. The architecture of FIG. 4 is based on the architecture shown and described with reference to FIG. 2. For clarity, elements in FIG. 4 that are also shown in FIG. 2 are designated using the same reference numerals that are used in FIG. 2.

One modification implemented in the present invention is the provision of a set of 2:1 multiplexers 140 is added between image buffers 70 and 80 and set of the 10:1 multiplexers 98 to select data to supply to waveform generator 106 for driving the LCD display panel (not shown) through analog multiplexers 110.

The select inputs of multiplexers 140 are driven by the signal line 92 which is also used to implement the standard prior-art blinking mode in which the entire image is alternatively blanked by means of the set of AND gates 100.

To configure this mode of display, one additional configuration register must be added in display mode configuration register 94 to store the bit "BLK2", therefore its output signal carries 1 more bit "BLK2" which is used to keep the frame buffer 80 from automatically loading the image stored in user holding register 70.

In normal mode of operation (no blinking or alternating two-image display) the timing generator 90 periodically asserts its enable output 142. If output 142 is asserted, BLK2 being not asserted, the output of AND gate 144 is also asserted. Therefore, the contents of user holding buffer 70 are loaded into frame buffer 80.

This normal mode of operation is the beginning of the mode of operation involving the alternating display of two images. To enter this mode, the configuration register 94 is accessed by the application software through system bus 26 and modified accordingly to assert the signal BLK2.

Assuming that an image has been loaded into frame buffer 80, asserting the signal BLK2 keeps the frame buffer 80 from automatically loading the image stored in user holding register 70. If the user holding register 70 is accessed by the application software through system bus 26, a different image can be loaded. If such a second image is loaded, the display controller contains two images.

To prevent the signal 92 from being passed directly to AND gates 144 that would clear data coming from the frame buffer, the OR gate 146 forces the AND gates 100 to be transparent when BLK2 is asserted.

Displaying two alternate images can be accomplished using the prior art architecture but software is involved each time a new image is displayed, so two times per second the microprocessor is awakened. With the present invention, one can display two alternate images without any software intervention, resulting in less power consumption reduction.

The present invention applies to any kind of LCD display panels, but also applies especially to dot matrix LCD panels that have higher resolution and are thus more capable of displaying small images compared to simple digit display LCD panels.

The present invention has advantages not enjoyed by the current solutions. Use of the present invention allows a smarter blinking mode with limited silicon area overhead. This may be interesting especially if the final application is a battery-powered electronic appliance.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A display controller configured to couple to a microcontroller having a power-off mode, the display controller comprising:
    a first set of registers to receive and hold data from the microcontroller, the data including image data to be displayed on a display panel;
    a second set of registers loadable from the first set of registers;
    a set of multiplexers having first data inputs coupled to the first set of registers, second data inputs coupled to the second set of registers, and select inputs; and
    logic circuitry coupled to the output of the set of multiplexers and to the control inputs of the multiplexers,
    wherein the logic circuitry is configured to provide select information to the set of multiplexers and to provide waveforms to the display panel to selectively display data from the first set of registers and the second set of registers in accordance with the select information, and wherein the logic circuitry is configured to determine whether the microcontroller is in the power-off mode and, if the microcontroller is not in the power-off mode, load the data from the first set of registers to the second set of registers, and, if the microcontroller is in the power-off mode, provide select information to the set of multiplexers to alternately display on the display panel first image data in the first set of registers and different second image data in the second set of registers.

2. The display controller of claim 1 configured to drive a liquid crystal display.

3. The display controller of claim 1 wherein the display panel is a Twisted Nematic Multiplexed LCD display.

4. The display controller of claim 1 wherein the select input pins of the set of multiplexers are configured to receive a periodic signal toggling from logical 0 to logical 1.

5. The display controller of claim 1 disposed in a microcontroller integrated circuit.

6. The display controller of claim 1, further comprising a configuration register configured to hold data from the microcontroller indicating whether or not the microcontroller is in the power-off mode.

7. A method performed by a display controller, the method comprising:
    determining that a microcontroller coupled to the display controller is not in a power-off mode and, in response, loading first image data from a first set of registers of the display controller to a second set of registers of the display controller;
    loading second image data different from the first image data into the first set of registers;
    determining that the microcontroller is in the power-off mode and, in response, providing select information to a set of multiplexers having data inputs coupled to the first set of registers, second data inputs coupled to the second set of registers, and select inputs, wherein providing select information includes providing select information to alternately displaying the first image data and the second image data on a display panel.

8. The method of claim 7 wherein the display panel is a Twisted Nematic Multiplexed LCD display.

* * * * *

UNITED STATES PATENT AND TRADEMARK OFFICE
CERTIFICATE OF CORRECTION

PATENT NO. : 8,102,401 B2
APPLICATION NO. : 11/740107
DATED : January 24, 2012
INVENTOR(S) : Alain Vergnes, Sebastien Younes and Jerome Alingry It is certified that error appears in the above-identified patent and that said Letters Patent is hereby corrected as shown below:

Column 2; line 24; delete "controller" insert -- controller. --

Claim 7; Column 8; line 41; delete "displaying" insert -- display --

Signed and Sealed this
Eighth Day of May, 2012

David J. Kappos
*Director of the United States Patent and Trademark Office*